US008742284B2

(12) United States Patent
Li et al.

(10) Patent No.: US 8,742,284 B2
(45) Date of Patent: Jun. 3, 2014

(54) STEAM PLASMA TORCH

(75) Inventors: Heng-Yi Li, Banciao (TW); Chin-Ching Tzeng, Yonghe (TW); Lieh-Chih Chang, Taipei (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 910 days.

(21) Appl. No.: 11/979,631

(22) Filed: Nov. 6, 2007

(65) Prior Publication Data

US 2010/0252537 A1 Oct. 7, 2010

(51) Int. Cl.
*B23K 9/00* (2006.01)

(52) U.S. Cl.
USPC .................................. 219/121.5; 219/121.48

(58) Field of Classification Search
USPC ............... 219/121.5, 121.48, 121.39, 121.59, 219/121.51, 121.52, 121.74, 121.75; 313/231.31, 231.41
See application file for complete search history.

(56) References Cited

U.S. PATENT DOCUMENTS 3,534,388 A * 10/1970 Akiyama et al. ......... 219/121.51
3,567,898 A * 3/1971 Fein .......................... 219/121.5
3,830,428 A * 8/1974 Dyos ............................ 239/11
4,275,287 A * 6/1981 Hiratake .................. 219/121.52
4,390,772 A * 6/1983 Hiratake .................. 219/121.51
4,521,666 A * 6/1985 Severance et al. ....... 219/121.59
4,861,962 A * 8/1989 Sanders et al. ............. 219/121.5
5,101,088 A * 3/1992 Andersson et al. ...... 219/121.45
5,120,930 A * 6/1992 Sanders et al. ............. 219/121.5
5,247,152 A * 9/1993 Blankenship ............ 219/121.49
5,304,770 A * 4/1994 Takabayashi .............. 219/121.5
5,609,777 A * 3/1997 Apunevich et al. ...... 219/121.48
5,660,743 A * 8/1997 Nemchinsky .............. 219/121.5
5,719,370 A * 2/1998 Apunevich et al. ...... 219/121.49
5,747,767 A * 5/1998 Severance et al. .......... 219/121.5
6,087,616 A * 7/2000 Apunevich et al. ...... 219/121.46
6,215,090 B1 * 4/2001 Severance et al. ....... 219/121.48
6,215,091 B1 * 4/2001 Chung et al. ............ 219/121.48
6,320,156 B1 * 11/2001 Yamaguchi et al. ....... 219/121.5
6,326,581 B1 * 12/2001 Laimer et al. ............ 219/121.39
6,346,685 B2 * 2/2002 Severance et al. .......... 219/121.5
2002/0108933 A1 * 8/2002 Hoffman et al. ......... 219/121.43
2005/0211685 A1 * 9/2005 Blankenship .............. 219/130.4

* cited by examiner

*Primary Examiner* — John Wasaff
(74) *Attorney, Agent, or Firm* — Jackson IPG PLLC

(57) ABSTRACT

A steam plasma torch includes a anode in the form of a nozzle, a first body for receiving the anode, a flow swirler mounted between the anode and the rod type cathode for inducing vorticity into working gas flow, an insulator connected to the first body, a second body connected to the insulator and formed with a thread, an adjusting element formed with a thread engaged with the thread of the second body, a collet fit in the adjusting element and a cathode in the form of a rod fit in the collet. A gap between the anode and cathode is adjusted when the adjusting element is rotated relative to the second body.

14 Claims, 2 Drawing Sheets

STEAM PLASMA TORCH

FIELD OF THE INVENTION

The present invention relates to a steam plasma torch and, more particularly, to a steam plasma torch in which water is used as coolant and later heated into steam used as working gas, and the gap between anode and cathode is adjustable during operation.

DESCRIPTION OF THE RELATED ARTS

There are various plasma torches such as those disclosed in Taiwanese Patent Nos. 336011 and 1264967 and U.S. Pat. No. 7,256,366. In the plasma torches, nitrogen, hydrogen, argon, air or any combination of the foregoing gases is used as working gas. On the other hand, water is used as coolant to cool the plasma electrodes to protect the plasma torches from overheating that would otherwise damage the plasma torches, thus extending the lives of the plasma torches.

The performance of a plasma torch is related to the sizes of anode and cathode used therein, gaps between the anode and the cathode, the materials thereof and the type of the working gas. After several operation hours, the anode and the cathode are gradually eroded so that the gap between them is broadened, and the arc would be quenched when the gap is over threshold value. To this end, the operation must be stopped to renew anode and cathode. This interruption is however not desired.

Therefore, the present invention is intended to obviate or at least alleviate the problems encountered in prior art.

SUMMARY OF THE INVENTION

The primary objective of the present invention is to provide a steam plasma torch in which water is used as coolant and later heated into steam used as working gas, and the gap between anode and cathode is adjustable during operation.

To achieve the foregoing objective, a steam plasma torch contains three sections. The positive section consists of a nozzle type anode and a torch body for connecting anode. The insulation section consists of a flow swirler mounted between the anode and the rod type cathode for inducing vorticity into working gas flow, and an insulator. The negative section consists of a cathode alignment, a cathode adjustment knob, a collet and a rod type cathode. The gap between the anode and cathode is adjusted when the adjusting element is rotated relative to the second body. At first the working gas enters into the torch body from the gas inlet, and is induced vorticity through a flow swirler. The plasma is produced when the swirl gas is heated and ionized by the arc between anode and cathode. Finally, the plasma becomes the heating source of the work piece after expanding, diffusing, and spraying out of the nozzle.

The other objectives, advantages and features of the present invention will become apparent from the following description referring to the drawings.

BRIEF DESCRIPTION OF THE DRAWINGS

The present invention will be described via the detailed illustration of the preferred embodiment referring to the drawings.

DETAILED DESCRIPTION OF EMBODIMENT

Figure 1:
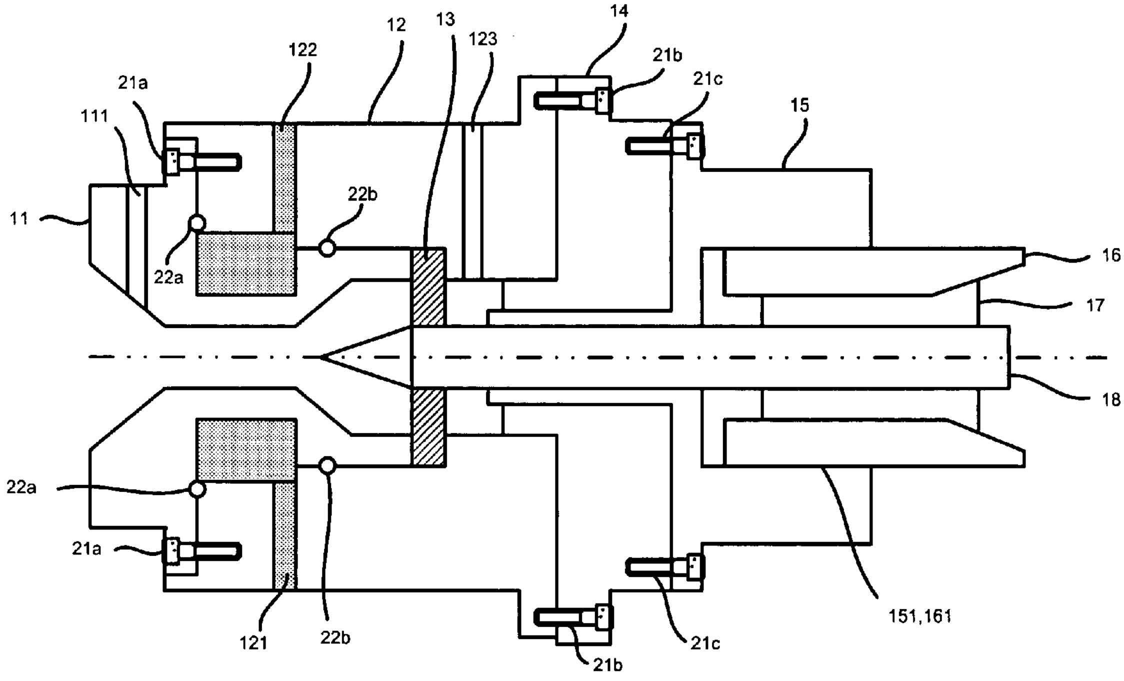
FIG. 1 is a cross-sectional view of a steam plasma torch according to the preferred embodiment of the present invention.

Referring to FIG. 1, there is shown a steam plasma torch 1 in which water is used as coolant and later heated into steam and used as working gas according to the preferred embodiment of the present invention. The steam plasma torch 1 is a non-transferred plasma torch. The steam plasma torch 1 includes a positive section, a negative section and an insulation section for insulating the positive section from the negative section.

The positive section includes an anode 11 and a body 12. The anode 11 is made of tough pitch copper. The anode 11 is in the form of a nozzle. The anode 11 includes a first section exposed from the body 12 and a second section inserted in the body 12. A spiral steam inlet 111 is defined in the first section of the anode 11.

The body 12 is made of stainless steel. The body 12 includes a coolant inlet 121 defined therein, a coolant outlet 122 defined therein and a working gas inlet 123 defined therein. The water can be introduced into the body 12 and used as the coolant for cooling the second section of the anode 11. The coolant inlet 121 is opposite to the coolant outlet 122. Thus, before leaving the body 12, the water goes over the second section of the anode 11 in the body 12 as far as possible. Hence, the water carries heat from the anode 11 as much as possible. The water is heated. Thus, it requires only a little heat to turn the heated water into steam. The steam will be introduced into the body 12 through the working gas inlet 123 and used as the working gas.

Two sealing rings 22*a* and 22*b* are provided between the anode 11 and the body 12. The sealing ring 22*a* is used to avoid the steam leaking between the anode 11 and the body 12. The sealing ring 22*b* is used to avoid the steam directly going to the working gas inlet 13 from the coolant inlet 121. The sealing rings 22*a* and 22*b* are made of rubber.

The negative section includes a cathode 18, a collet 17, an adjusting element 16 and a body 15. The cathode 18 is made of tough pitch copper. The cathode 18 is in the form of a rod including a first section inserted in the body 12, a second section extended from the first section and a third section extended from the second section.

The collet 17 is made of metal. The collet 17 is provided on the third section of the cathode 18. The collet 17 is used to align the axis of the cathode 18 to that of the anode 11.

The adjusting element 16 is a tubular element in which the collet 17 is fit. Thus, the collet 17 can be moved and rotated together with adjusting element 16. The adjusting element 16 includes a thread 161 on an external side.

The body 15 is a tubular element in which the adjusting element 16 is inserted. The body 15 includes a thread 151 on an internal side. The thread 161 is engaged with the thread 151. Thus, the adjusting element 16 is moved relative to the body 15 when the former is rotated relative to the latter. On the other hand, the body 15 is secured to the insulation section so that the gap between the cathode 18 and the anode 11 is adjusted when the adjusting element 16 is rotated in the body 15. The threads 151 and 161 are preferably fine threads so that the adjustment of the gap between the cathode 18 and the anode 11 is fine.

There may be a scale on the external side of the adjusting element 16. The scale can be observed so that the gap between the cathode 18 and the anode 11 can be learned.

The insulation section includes a flow swirler 13 and an insulator 14. The flow swirler 13 is made of an insulating material such as ceramic. The flow swirler 13 is disposed in the body 12 and sandwiched between a portion of the body 12 and the second section of the anode 11. The flow swirler 13 is in the form of a ring provided on the first section of the cathode 18. Although not shown for being conventional, the flow swirler 13 includes tangential conduits through which the steam can go into the anode 11 from the body 12.

The insulator 14 is made of an insulating material such as Teflon. The insulator 14 is attached to the body 12 with a plurality of threaded bolts 21*b*. The insulator 14 is a tubular element in which the second section of the cathode 18 is inserted. The body 15 is secured to the insulator 14 with threaded bolts 21*c*.

Figure 2:
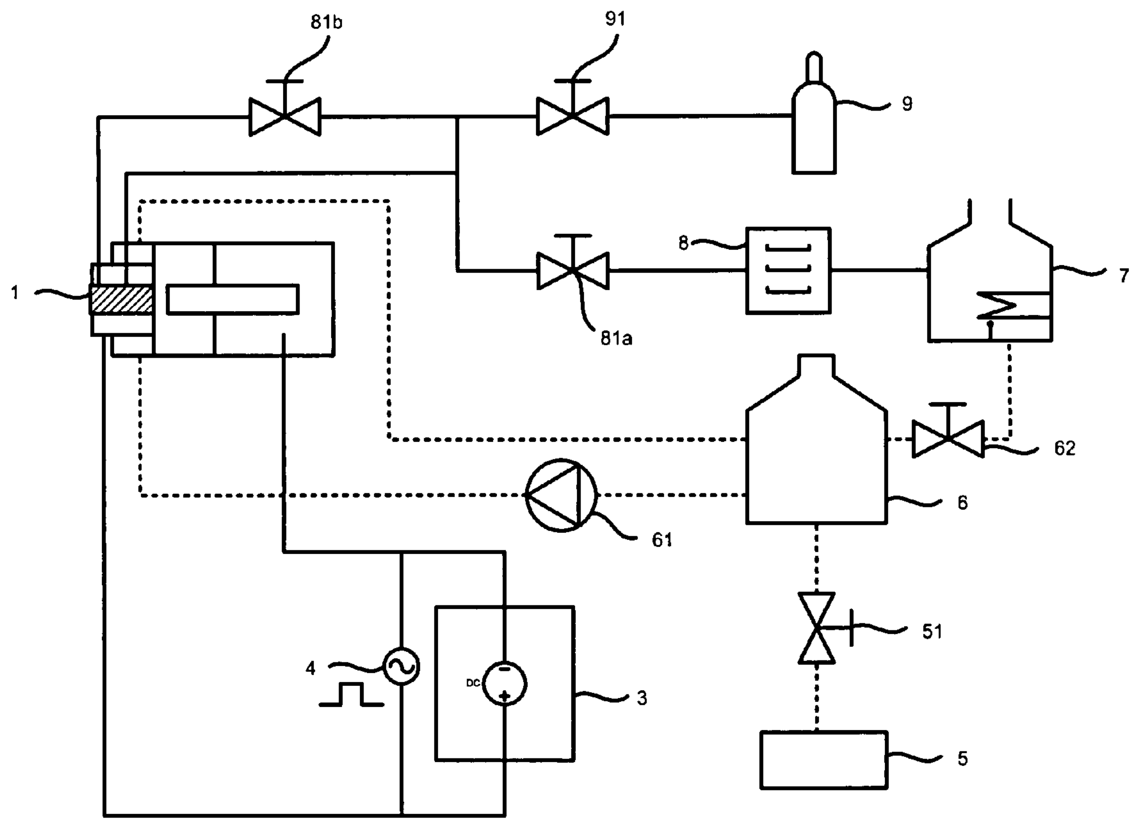
FIG. 2 is a block diagram of a torch system including the steam plasma torch shown and peripherals in FIG. 1.

Referring to FIG. 2, there is shown a torch system including the steam plasma torch 1. The torch system includes a power supply 3, an ignition device 4, a water supply 5, a circulating water tank 6, a steam generator 7, a water-removing element 8 and an argon tank 9.

The power supply 3 includes a positive electrode connected to the anode 11 via a wire and a negative electrode connected to the cathode 18 via another wire.

The ignition device 4 includes a positive electrode connected to the positive electrode of the power supply 3 and a negative electrode connected to the negative electrode of the power supply 3. Thus, the ignition device 4 can be energized by the power supply 3 to induce an arc between the cathode 18 and the positive electrode 12.

The water supply 5 is used to supply the water. A valve 51 is provided between the circulating water tank 6 and the water supply 5. The flow rate of the water into the circulating element 6 from the water supply 5 is under the control of the valve 51.

The circulating water tank 6 is used to transfer the steam in a coolant path and in a working gas path separated from the coolant path. The coolant path in the circulating water tank 6 is connected to the valve 51 on one hand and connected to the coolant inlet 121 of the body 12 on the other hand. A circulating pump 61 is provided between the coolant path in the circulating water tank 6 and the coolant inlet 121 of the body 12. The working gas path in the circulating water tank 6 is connected to the coolant outlet 122 of the body 12 on one hand and connected to the steam generator 7 on the other hand. A valve is provided between the working gas path in the circulating water tank 6 and the steam generator 7.

The steam generator 7 is used to heat and turn the heated water into the steam. Some of the steam however condenses and becomes water again after leaving the steam generator 7.

The water-removing element 8 is connected to the steam generator 7. The water-removing element 8 is used to remove the water that comes from the condensation of the steam after leaving the steam generator 7. In addition, the water-removing element 8 is connected to the working gas inlet 123 of the body 12 and connected to the spiral steam inlet 111 of the anode 11.

A valve 81*a* is provided between the water-removing element 8 and the working gas inlet 123 of the body 12.

A valve 81*b* is provided between the valve 81*a* and the spiral steam inlet 111 of the anode 11.

A valve 91 is provided between the argon tank 9 and the working gas inlet 123 of the body 12.

The operation of the torch system will be described. When the valve 51 is open, the water goes into the coolant path in the circulating water tank 6 from the water supply 5. When the circulating pump 61 is running, the water goes into the steam plasma torch through the coolant inlet 121. The water cools the steam plasma torch 1. The water is heated. The heated water goes into the working gas path in the circulating water tank 6. When the valve 62 is open, the heated water goes into the steam generator 7, which turns the heated water into the steam without consuming much energy.

At an arc-inducing stage, the valves 81*a* and 81*b* are closed, but the valve is open, thus allowing argon to go from the argon tank 9 into the steam plasma torch 1 through the working gas inlet 123. The power supply 3 is turned on to energize the arc-inducing element 4 to cause the pyrolysis of the argon to generate an arc in the steam plasma torch 1.

Then, at a heating-up stage, the valve 81*a* is open, thus allowing the steam to go from the steam generator 7 into the steam plasma torch 1 through the working gas inlet 123. The flow rate of the steam going through the working gas inlet 123 is gradually increased under the control of the valve 81*a*. The power of the power supply 3 is increased. The valve 91 is closed.

To further increase the power of the steam plasma torch 1, the valve 81*b* is open, thus allowing the steam to go from the steam generator 7 into the steam plasma torch 1 through the spiral steam inlet 111. The flow rate of the steam going through the spiral steam inlet 111 is gradually increased under the control of the vale 81*b*. The steam flowing through the spiral steam inlet 111 is useful for stabilizing the arc. The power of the power supply 3 is increased.

The arc however erodes the anode 11, thus expanding the gap between the anode 11 and the cathode 18. In this case, the cathode 18 can be moved towards the anode 11 via rotating the adjusting element 16 relative to the body 15 during the operation of the steam plasma torch 1. That is, the operation of the steam plasma torch 1 does not have to be interrupted often. Time is saved, and the cost in operation is lowered.

The steam plasma torch 1 can be used to gasify organic substances, process waste, re-process ash from garbage incinerators, weld metal, cut things and process integrated circuit boards.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A steam plasma torch comprising:

an anode in the form of a nozzle;

a first body for receiving the anode;

an insulator connected to the first body;

a second body connected to the insulator, the second body comprising a thread on an internal side;

an adjusting element comprising, on an external side, a thread engaged with the internal thread of the second body;

a collet fit in the adjusting element;

a cathode in the form of a rod fit in the collet so that a gap between the anode and cathode is adjusted when the adjusting element is rotated relative to the second body; and a flow swirler mounted between the anode and the rod type cathode for inducing vorticity into an injected working steam flow, wherein water passes through the steam plasma torch to cool the torch and wherein a portion of the cooling water is further heated to supply the working steam flow.

2. The steam plasma torch according to claim 1, wherein the anode comprises a spiral steam inlet defined therein.

3. The steam plasma torch according to claim 1, wherein the anode is made of tough pitch copper.

4. The steam plasma torch according to claim 1, wherein the first body comprises a coolant inlet defined therein, a coolant outlet defined therein and a working steam inlet defined therein.

5. The steam plasma torch according to claim 1, wherein the first body is made of stainless steel.

6. The steam plasma torch according to claim 1 comprising two sealing rings between the anode nozzle and the first body.

7. The steam plasma torch according to claim 6, wherein the sealing rings are made of rubber.

8. The steam plasma torch according to claim 1, wherein the anode is separated from the cathode by the flow swirler and the insulator.

9. The steam plasma torch according to claim 1, wherein the flow swirler is made of ceramic.

10. The steam plasma torch according to claim 1, wherein the rod type cathode is mounted on the collet, and a center line of the rod type cathode is matched with the anode and the flow swirler.

11. The steam plasma torch according to claim 1, wherein the collet is made of metal.

12. The steam plasma torch according to claim 1, wherein the steam plasma torch is a non-transferred plasma torch.

13. A torch system comprising:

the steam plasma torch in accordance with claim 1;

a power supply connected to the anode and cathode;

an arc-inducing element connected to the power supply and the anode and cathode;

a water supply for providing water;

a circulating element connected to the water supply and the coolant inlet and outlet;

a steam generator connected to the circulating element;

a water-removing element connected to the steam generator and the working steam inlet; and an argon tank connected to the working steam inlet.

14. The torch system according to claim 13, wherein the anode comprises a spiral stream inlet defined therein, and the water-removing element is connected to the spiral steam inlet.

* * * * *